United States Patent
Azuma et al.

(10) Patent No.: US 10,639,743 B2
(45) Date of Patent: *May 5, 2020

(54) VACUUM INSULATION PANEL MANUFACTURING METHOD, AND VACUUM INSULATION PANEL

(71) Applicant: NIPPON STEEL NISSHIN CO., LTD., Chiyoda-ku, Tokyo (JP)

(72) Inventors: Tsutomu Azuma, Tokyo (JP); Hirohisa Mishima, Tokyo (JP); Takefumi Nakako, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/308,948

(22) PCT Filed: May 31, 2017

(86) PCT No.: PCT/JP2017/020290
§ 371 (c)(1),
(2) Date: Dec. 11, 2018

(87) PCT Pub. No.: WO2017/217233
PCT Pub. Date: Dec. 21, 2017

(65) Prior Publication Data
US 2019/0143450 A1    May 16, 2019

(30) Foreign Application Priority Data

Jun. 13, 2016  (JP) .................................. 2016-117305
Feb. 10, 2017  (JP) .................................. 2017-023648

(51) Int. Cl.
*F16L 59/065*    (2006.01)
*B23K 26/21*    (2014.01)
(Continued)

(52) U.S. Cl.
CPC ............ *B23K 26/21* (2015.10); *B23K 11/061* (2013.01); *B23K 11/16* (2013.01); *B23K 11/34* (2013.01);
(Continued)

(58) Field of Classification Search
CPC .... Y10T 428/231; F16L 59/065; E04B 1/803; F25D 2201/14; Y02B 80/12
See application file for complete search history.

(56) References Cited

U.S. PATENT DOCUMENTS

| 4,527,042 A | 7/1985 | Shinohara et al. |
|---|---|---|
| 6,761,966 B2 | 7/2004 | Kim et al. |
| 2011/0213321 A1 | 9/2011 | Fattman et al. |

FOREIGN PATENT DOCUMENTS

| JP | S63232122 A | 9/1988 |
|---|---|---|
| JP | H0187030 A | 6/1989 |

(Continued)

OTHER PUBLICATIONS

International Search Report corresponding to Application No. PCT/JP2017/020290; dated Jul. 18, 2017.

(Continued)

*Primary Examiner* — Alexander S Thomas
(74) *Attorney, Agent, or Firm* — Cantor Colburn LLP

(57) ABSTRACT

A vacuum insulation panel manufacturing method that makes it possible to manufacture low-cost, high-performance vacuum insulation panels, and a vacuum insulation panel are provided. This method of manufacturing a vacuum insulation panel involves: a stacking step in which a first metal plate is stacked on one side of an insulating core material, and in which a backing member having an opening and a second metal plate having an evacuation port are stacked, with the opening and the evacuation port stacking, on the other surface of the core member in the order of (Continued)

backing member and second metal plate from the core member side; a first welding step for welding outwards of where the core member is arranged in the first metal plate and the second metal plate; an evacuating step from the evacuation port to create a vacuum in an inner area which is held between the first metal plate and the second metal plate and in which the core member is arranged; and a laser welding step in which, in a state in which the inner area is made into a vacuum by the evacuating step, the evacuation port is sealed by means of a sealing material and the sealing material, the second metal plate and the backing member are laser welded.

4 Claims, 11 Drawing Sheets

(51) Int. Cl.
| | |
|---|---|
| B23K 26/10 | (2006.01) |
| B23K 37/04 | (2006.01) |
| B23K 11/36 | (2006.01) |
| B23K 37/02 | (2006.01) |
| B23K 26/60 | (2014.01) |
| B23K 11/06 | (2006.01) |
| B23K 26/20 | (2014.01) |
| B23K 26/28 | (2014.01) |
| B23K 26/32 | (2014.01) |
| B23K 11/16 | (2006.01) |
| B23K 11/34 | (2006.01) |
| E04B 1/80 | (2006.01) |
| F16L 59/02 | (2006.01) |
| F25D 23/06 | (2006.01) |
| B23K 103/16 | (2006.01) |

(52) U.S. Cl.
CPC ............ *B23K 11/36* (2013.01); *B23K 26/103* (2013.01); *B23K 26/206* (2013.01); *B23K 26/28* (2013.01); *B23K 26/32* (2013.01); *B23K 26/60* (2015.10); *B23K 37/0229* (2013.01); *B23K 37/0408* (2013.01); *B23K 37/0443* (2013.01); *E04B 1/803* (2013.01); *F16L 59/029* (2013.01); *F16L 59/065* (2013.01); *F25D 23/066* (2013.01); *B23K 2103/172* (2018.08); *B32B 2307/304* (2013.01); *F25D 2201/14* (2013.01); *Y10T 428/231* (2015.01)

(56) References Cited

FOREIGN PATENT DOCUMENTS

| | | |
|---|---|---|
| JP | H0261358 B2 | 12/1990 |
| JP | H04231187 A | 8/1992 |
| JP | 2000149791 A | 5/2000 |
| JP | 2001108184 A | 4/2001 |
| JP | 2001287074 A | 10/2001 |
| JP | 2001311497 A | 11/2001 |
| JP | 2002050711 A | 2/2002 |
| JP | 2002144072 A | 5/2002 |
| JP | 2004205794 A | 7/2004 |
| JP | 2006017165 A | 1/2006 |
| JP | 4365736 B2 | 11/2009 |
| JP | 2010003763 A | 1/2010 |
| JP | 2010255178 A | 11/2010 |
| JP | 2015083281 A | 4/2015 |

OTHER PUBLICATIONS

JPO Notice of Reasons for Rejection corresponding to Application No. 2016-117305; dated Jul. 18, 2017.
JPO Notice of Reasons for Rejection corresponding to Application No. 2017-023648; dated Jul. 18, 2017.
Extended European Search Report corresponding to Application No. 17813134.8-1016/3460309 PCT/JP2017020286; dated Jul. 16, 2019.
Extended European Search Report corresponding to Application No. 17813135.5-1016/3460310 PCT/JP2017020290; dated Jul. 19, 2019.
International Search Report issued in International Application No. PCT/JP2017/020286 dated Jul. 18, 2017.
JP Notice of Reasons for Rejection corresponding to Application No. 2016-117304; dated Jul. 18, 2017.
USPTO Non-Final Office Action corresponding to U.S. Appl. No. 16/229,233; dated Jul. 26, 2019.

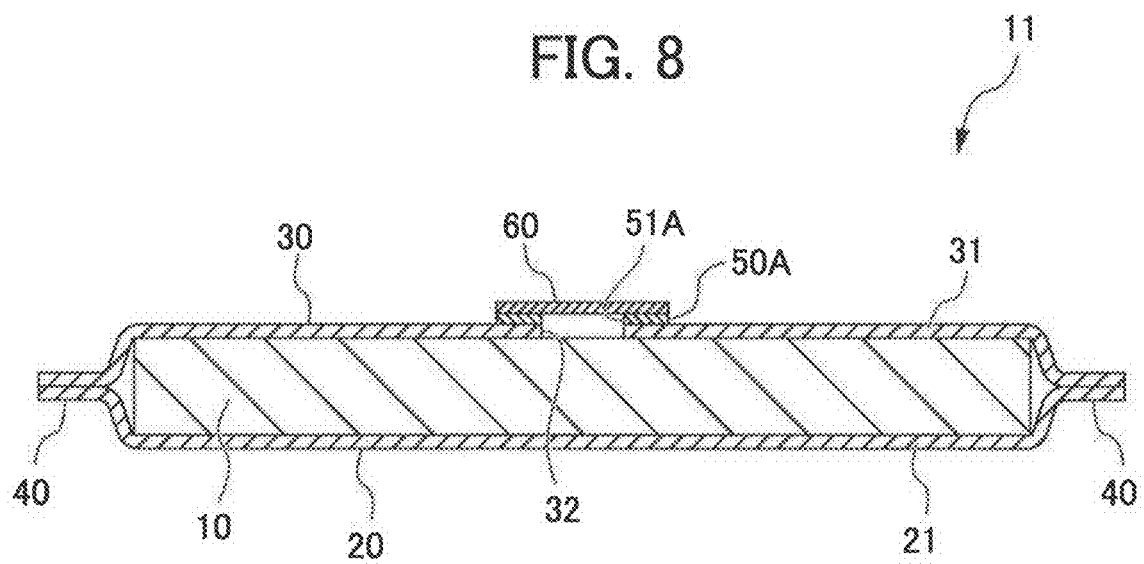

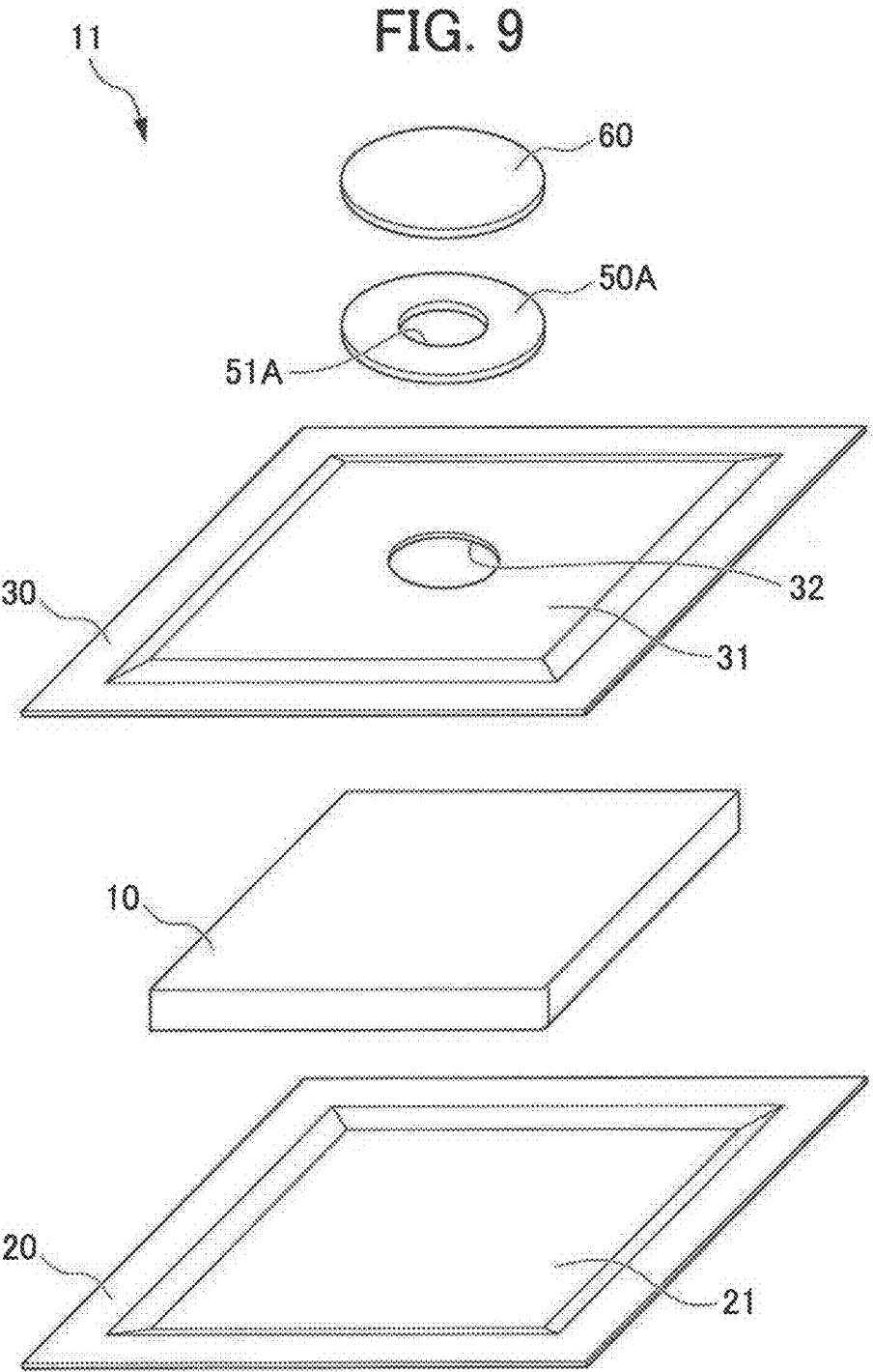

VACUUM INSULATION PANEL MANUFACTURING METHOD, AND VACUUM INSULATION PANEL

CROSS REFERENCE TO RELATED APPLICATIONS

This is the U.S. national stage of application No. PCT/JP2017/020290, filed on May 31, 2017. Priority under 35 U.S.C. § 119(a) and 35 U.S.C. § 365(b) is claimed from Japanese Application No. 2017-023648, filed on Feb. 10, 2017 and Japanese Application No. 2016-117305, filed on Jun. 13, 2016, the disclosure of which is also incorporated herein by reference.

TECHNICAL FIELD

The present invention relates to a vacuum insulation panel manufacturing method, and vacuum insulation panel suitably used for a refrigerator, a cold storage, a hot storage, a heat insulating wall of a house or the like, and so on.

BACKGROUND ART

In recent years, development of energy-saving products and energy-saving techniques is in progress in every industry with regard to electric power shortage and so on. Vacuum insulation panels are products developed as one of energy-saving measures. At present, the panels are widely adopted as a heat insulating material for refrigerators, vending machines, and the like and for heat insulating performance enhancement and electric power consumption reduction. Also in progress is examination for application as a heat insulating material for houses. In general, existing vacuum insulation panels have a structure in which a core member such as glass wool is heat sealed with an aluminum laminate film.

In a vacuum insulation panel heat sealed with an aluminum laminate film, moisture permeation from a heat seal portion results in a decrease in the degree of vacuum, and enclosure with an adsorbent such as activated carbon and zeolite is performed in this regard. Even so, a problem arises as the heat insulating performance is halved in seven to eight years. Desired in this regard is development of a vacuum insulation panel capable of maintaining its heat insulating properties for a long time. Developed as a vacuum insulation panel having long-term heat insulation properties is a vacuum insulation panel that is evacuated inside and has a stainless steel-based end portion welded in a state where a core member such as glass wool is wrapped with a thin metal plate such as a stainless steel plate.

Patent Document 1 discloses a method for manufacturing such vacuum insulation panels. In the method, a heat insulating material is arranged in the space that is formed by an inner plate body and an outer plate body provided with an evacuation port, a laminated body is prepared in which the peripheral edge portions of the outer and inner plate bodies are welded, a sealing member is placed on the wax that is arranged around the evacuation port, the laminated body is arranged in a chamber, vacuum suctioning is performed from the evacuation port by a vacuum suction unit, the wax is melted by heating of the laminated body, and the evacuation port is sealed by the sealing member.

Patent Document 2 discloses a vacuum insulation panel manufacturing method by which a heat insulating material that has a thick-walled region and a thin-walled region is arranged in a substantially flat plate-shaped space formed in a metallic plate-shaped body and evacuation is performed from an evacuation port provided in a place laminated with the thin-walled region of the metallic plate-shaped body.

Patent Document 1: Japanese Patent No. 4365736
Patent Document 2: Japanese Unexamined Patent Application, Publication No. 2001-311497

DISCLOSURE OF THE INVENTION

Problems to be Solved by the Invention

According to the manufacturing method disclosed in Patent Document 1, evacuation and brazing are performed in the chamber. Accordingly, the chamber is required into which the entire laminated body of the outer and inner plate bodies and the heat insulating material is put. In addition, a heating unit in the chamber is required since brazing is performed in the chamber. As a result, the size of the vacuum insulation panel manufacturing device increases to entail costs.

According to the manufacturing method disclosed in Patent Document 2, evacuation leads to a recess and flatness deterioration in the thin-walled portion of the heat insulating material. Also, the recess results in a decline in heat insulating performance. The thin-walled region is compressed as a result of the initial evacuation, and then the upper and lower metallic plate-shaped bodies approach each other and the evacuation passage is blocked. Accordingly, the air in the thick-walled region cannot be guided to the evacuation port with ease, and evacuation to a high vacuum is impossible (no high-performance vacuum insulation panel can be manufactured).

An object of the present invention is to provide a vacuum insulation panel manufacturing method that makes it possible to manufacture low-cost, high-performance vacuum insulation panels, and a low-cost, high-performance vacuum insulation panel.

Means for Solving the Problems (1) An aspect of the present invention related to a vacuum insulation panel manufacturing method comprising: a stacking step in which a first metal plate is stacked on one side of an insulating core member, and in which a backing member having an opening and a second metal plate having an evacuation port are stacked, with the opening and the evacuation port stacking, on the other surface of the core member in the order of the backing member and the second metal plate from the core member side; a first welding step for welding outwards of where the core member is arranged in the first metal plate and the second metal plate; an evacuating step for applying a vacuum in an inner area which is held between the first metal plate and the second metal plate and in which the core member is arranged, from the evacuation port; and a laser welding step in which, in a state in which the inner area is made into a vacuum by the evacuating step, the evacuation port is sealed by means of a sealing member and the sealing member, the second metal plate and the backing member are laser welded.

(2) The evacuating step of (1) may apply a vacuum in an inner area which is held between the first metal plate and the second metal plate and in which the core member is arranged, from the evacuation port by evacuating a chamber by covering with the chamber a partial region including the evacuation port of the second metal plate.

(3) Other aspect of the present invention related to a vacuum insulation panel manufacturing method comprising:

a stacking step in which a first metal plate is stacked on one side of an insulating core member, and in which a second metal plate having an evacuation port and a reinforcing material having an opening are stacked, with the evacuation port and the opening stacking, on the other surface of the core member sequentially from the core member; a first welding step for welding outwards of where the core member is arranged in the first metal plate and the second metal plate; an evacuating step through the evacuation port and the opening to create a vacuum in an inner area which is held between the first metal plate and the second metal plate and in which the core member is arranged; and a laser welding step in which, in a state in which the inner area is made into a vacuum by the evacuating step, the evacuation port and the opening are sealed by means of a sealing member and the sealing member and the reinforcing material or the sealing member, the reinforcing material, and the second metal plate are laser welded.

(4) The stacking step of (3) may include a step in which the second metal plate and the reinforcing material are welded.

(5) The evacuating step of (3) or (4) may apply a vacuum in an inner area which is held between the first metal plate and the second metal plate and in which the core member is arranged, from the evacuation port by evacuating a chamber by covering with the chamber a region including the opening of the reinforcing material.

(6) Laser irradiation may be performed from an outer side of the chamber in the laser welding step of (2) or (5).

(7) The sealing member of (1) to (6) may be made of a magnetic body, and the evacuating step includes a pressing step for holding the sealing member by using a magnetic force and pressing the sealing member against the evacuation port.

(8) The first welding step of (1) to (7) may be a seam welding step.

(9) Further aspect of the present invention related to a vacuum insulation panel comprising: an insulating core member; a first metal plate arranged on one side of the core member; a backing member having an opening and arranged on the other surface of the core member; a second metal plate arranged across the backing member on the other surface of the core member and having an evacuation port at a position stacking with the opening; and a sealing member sealing the opening, wherein outer sides of regions of the first metal plate and the second metal plate between which the core member is sandwiched are welded, wherein the sealing member, the second metal plate, and the backing member are welded, and wherein a vacuum state is created between the first metal plate and the second metal plate.

(10) Other aspect of the present invention related to a vacuum insulation panel comprising: an insulating core member; and a first metal plate arranged on one side of the core member; and sequentially from the core member on the other surface of the core member, a second metal plate and having an evacuation port; a reinforcing material having an opening at a position stacking with the evacuation port; and a sealing member sealing the opening, wherein outer sides of regions of the first metal plate and the second metal plate between which the core member is sandwiched are welded, wherein the sealing member, the reinforcing material, and the second metal plate are welded, and wherein a vacuum state is created between the first metal plate and the second metal plate.

(11) The sealing member may be a magnetic body in (9) or (10).

Effects of the Invention

According to the present invention a vacuum insulation panel manufacturing method that makes it possible to manufacture low-cost, high-performance vacuum insulation panels, and a low-cost, high-performance vacuum insulation panel can be provided

BRIEF DESCRIPTION OF THE DRAWINGS

FIG. 8 is a cross-sectional view of a vacuum insulation panel 11 of a second embodiment.

FIG. 9 is an exploded view of the vacuum insulation panel 11 of the second embodiment.

PREFERRED MODE FOR CARRYING OUT THE INVENTION

First Embodiment

Figure 1:
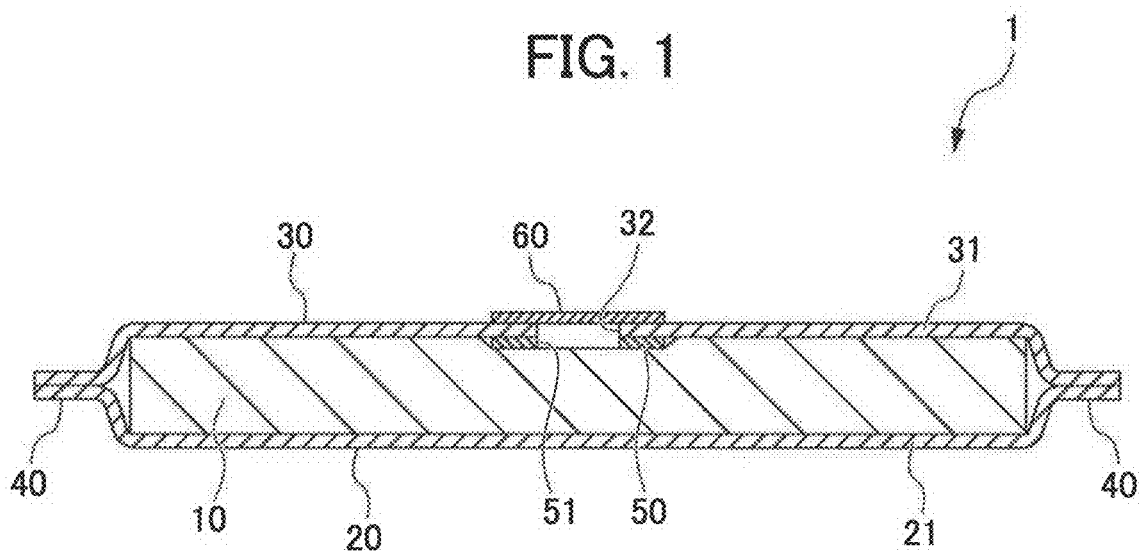
FIG. 1 is a cross-sectional view of a vacuum insulation panel 1 of the first embodiment.
Figure 2:
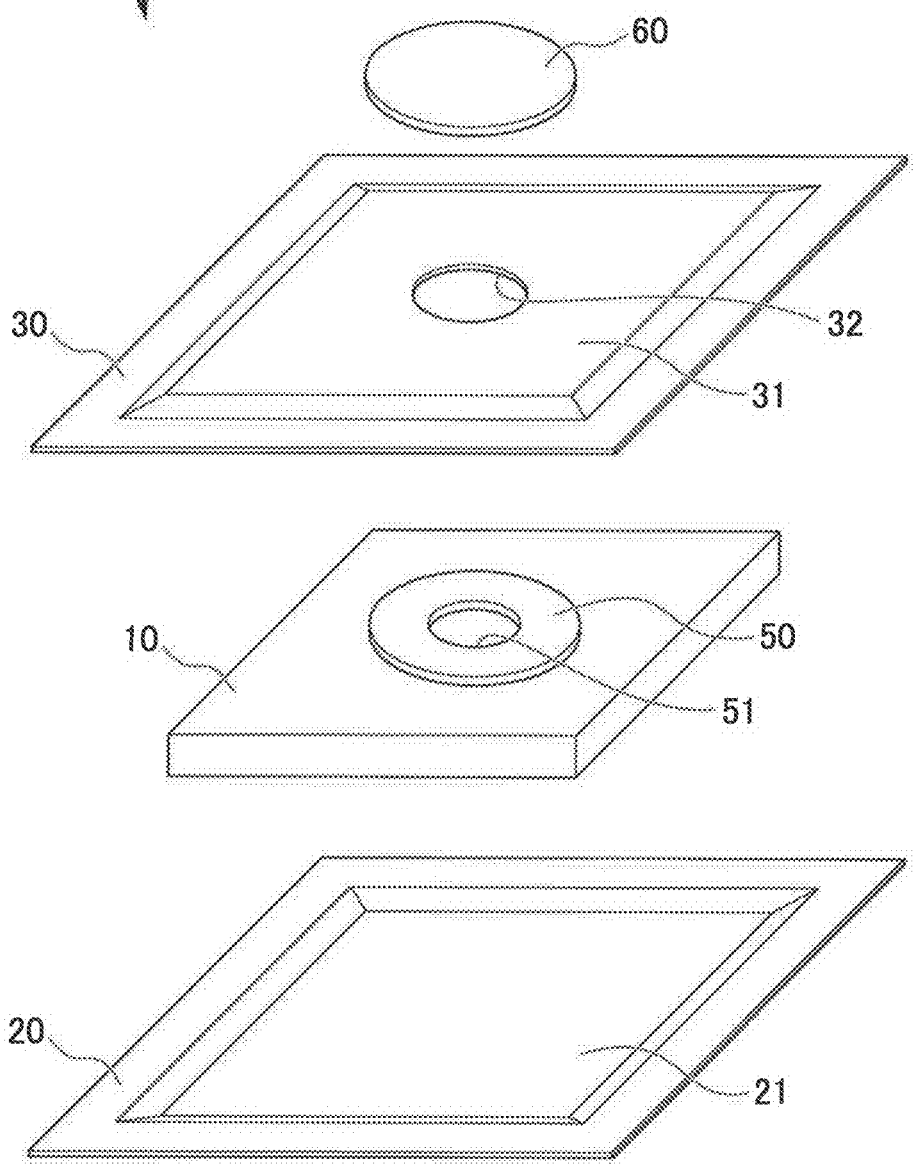
FIG. 2 is an exploded view of the vacuum insulation panel 1 of the first embodiment.

Hereinafter, a first embodiment of a method for manufacturing a vacuum insulation panel 1 of the present invention and the vacuum insulation panel 1 manufactured by the manufacturing method will be described with reference to accompanying drawings. FIG. 1 is a cross-sectional view of a vacuum insulation panel 1 of the first embodiment. FIG. 2 is an exploded view of the vacuum insulation panel 1 of the first embodiment.

(Overall Configuration)

The vacuum insulation panel 1 is provided with a core member 10 made of an insulating material and a first metal plate 20 and a second metal plate 30 arranged so as to sandwich the core member 10.

Bulging portions 21 and 31 are provided in the middle portions of the first metal plate 20 and the second metal plate 30. The first metal plate 20 and the second metal plate 30 are stacked in a state where the core member 10 is accommodated in the recessed portion that is on the inner surface sides of the bulging portions 21 and 31.

Peripheral edge portions 40 (four sides) of the stacked first metal plate 20 and second metal plate 30 are seam welded.

An evacuation port 32, which is a circular opening, is provided in the middle of the second metal plate 30. An annular backing member 50 is arranged inside the second metal plate 30 across the evacuation port 32, a circular sealing member 60 is arranged outside the second metal plate 30, and the evacuation port 32 is sealed as a result.

The backing member 50, the second metal plate 30, and the sealing member 60 are laser welded as described later, and the inside of the vacuum insulation panel 1 is maintained in a vacuum state.

(Core Member 10)

The core member 10 is formed by organic fibers such as synthetic fibers and natural fibers or inorganic fibers such as glass fibers and rock wool, which are insulating materials, being laminated so as to have a predetermined thickness.

(Metal Plates 20 and 30)

In the embodiment, the first metal plate 20 and the second metal plate 30 are formed in a rectangular shape slightly larger than the core member 10 in plain view and are arranged so as to cover the upper surface and the lower surface of the core member 10.

Although various metal plates such as an aluminum alloy plate and a stainless steel plate can be used as the material of the first metal plate 20 and the second metal plate 30, a stainless steel plate excellent in strength and corrosion resistance is preferably used from the viewpoint of deformation resistance and appearance maintenance over a long period of time.

The thicknesses of the first metal plate 20 and the second metal plate 30 are preferably 0.1 mm to 0.3 mm from the viewpoint of reducing the weight of the vacuum insulation panel 1 while suitably maintaining the vacuum state inside the vacuum insulation panel 1.

(Bulging Portions 21 and 31)

The first metal plate 20 and the second metal plate 30 are provided with the bulging portions 21 and 31 for core member accommodation. The bulging portions 21 and 31 have a shape in which the respective inner surface sides of the first metal plate 20 and the second metal plate 30 are recessed in a shape corresponding to the core member 10 and bulge to the outer surface sides.

(Evacuation Port 32)

The evacuation port 32 is provided in the middle of the bulging portion 31 of the second metal plate 30.

(Backing Member 50, Sealing Member 60)

The backing member 50 has an annular shape, and an opening portion 51 having the same diameter as the evacuation port 32 provided in the second metal plate 30 is provided in the middle of the backing member 50. The sealing member 60 has a disk shape and has the same diameter as the backing member 50. In the embodiment, SUS 430 as a magnetic body is used as the backing member 50 and the sealing member 60. However, the present invention is not limited thereto, and the backing member 50 may be another metal member without having to be limited to the magnetic body and the sealing member 60 may be another magnetic body.

(Vacuum Insulation Panel Manufacturing Device 2)

Figure 3:
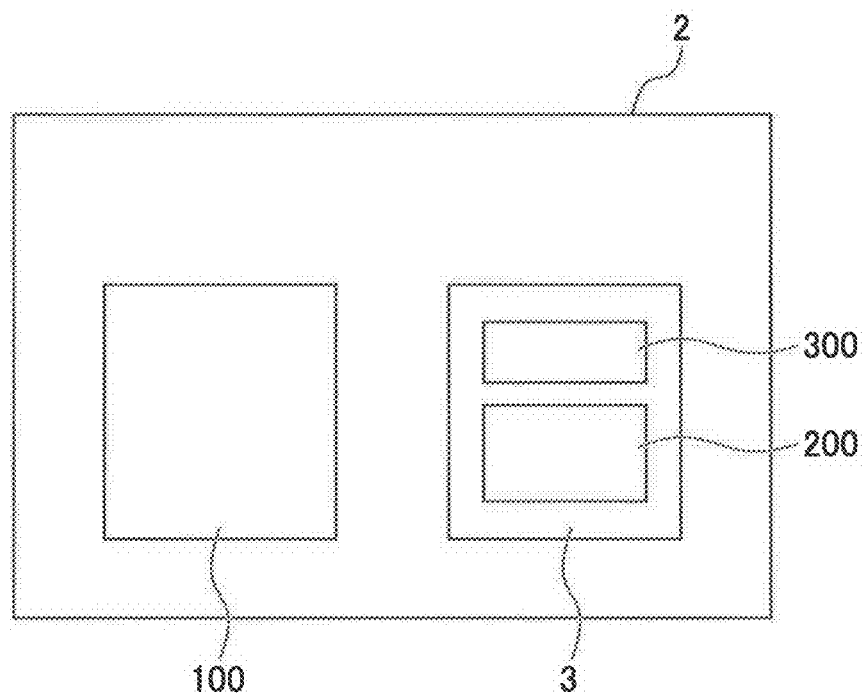
FIG. 3 is a block diagram of a vacuum insulation panel manufacturing device 2 manufacturing the vacuum insulation panel 1 of the first embodiment.

Next, the vacuum insulation panel manufacturing device 2 for manufacturing the vacuum insulation panel 1 will be described. FIG. 3 is a block diagram of the vacuum insulation panel manufacturing device 2. The vacuum insulation panel manufacturing device 2 is provided with a seam welding device 100 performing a seam welding step on the outer peripheries of the first metal plate 20 and the second metal plate 30 and a vacuum device 3 performing vacuum creation and sealing on the inside of a panel in a state where a vacuum is yet to be created inside with seam welding performed. The vacuum device 3 is provided with a vacuum suction unit 200 and a laser welding unit 300.

(Seam Welding Device 100)

Figure 4:
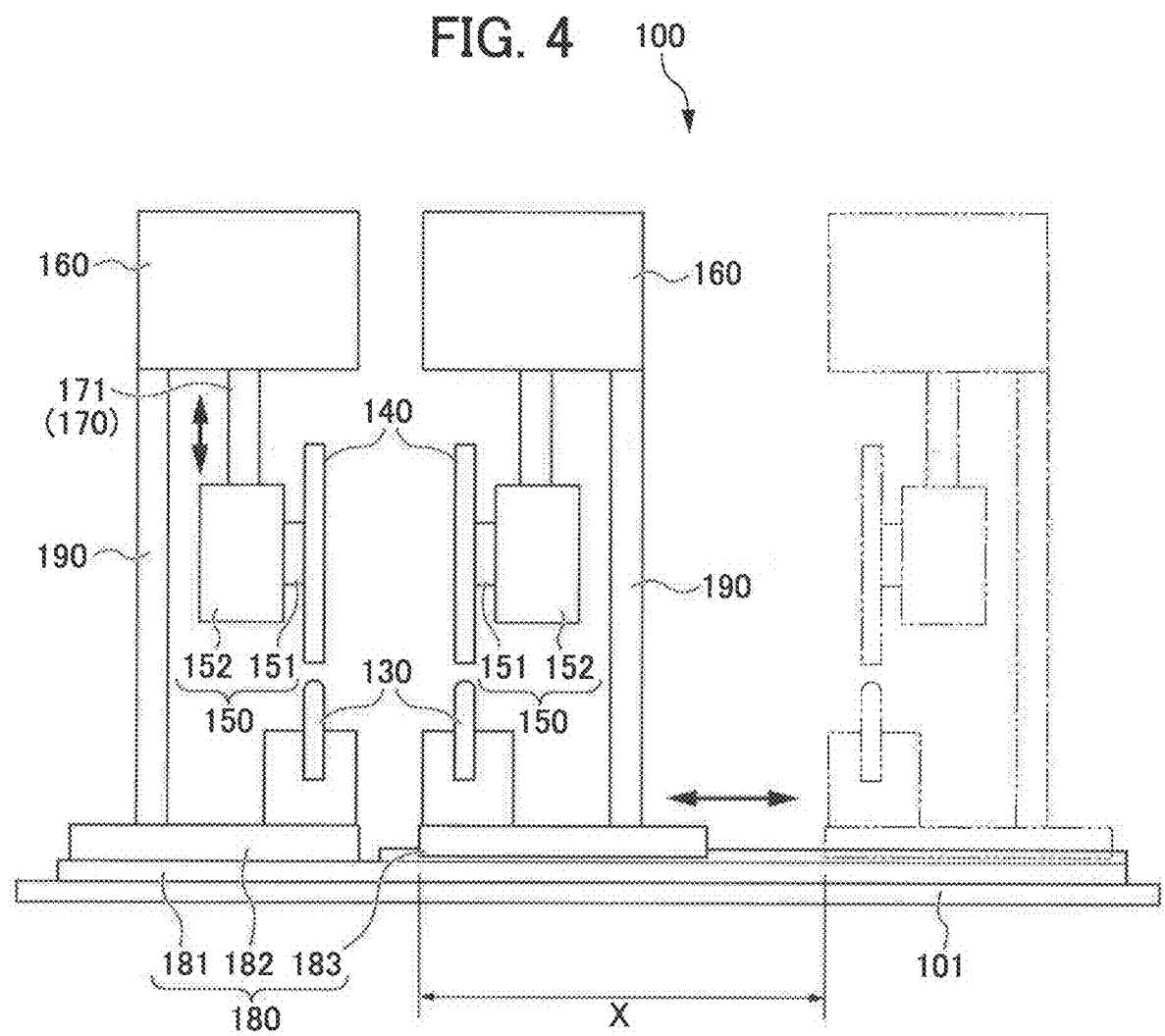
FIG. 4 is a diagram illustrating a seam welding device 100.

The seam welding device 100 will be described first. FIG. 4 is a diagram illustrating the seam welding device 100, and FIG. 5 is a schematic perspective view of the seam welding device 100.

The seam welding device 100 is provided with a plurality of lower electrodes 130, a plurality of upper electrodes 140, a plurality of upper electrode support members 150 supporting the plurality of upper electrodes 140, an upper electrode moving mechanism 160, a first inter-electrode distance variable mechanism 170, and a second inter-electrode distance variable mechanism 180.

In the present embodiment, two lower electrodes 130, two upper electrodes 140, two upper electrode support members 150, two upper electrode moving mechanisms 160, and two first inter-electrode distance variable mechanisms 170 are provided.

Figure 5:
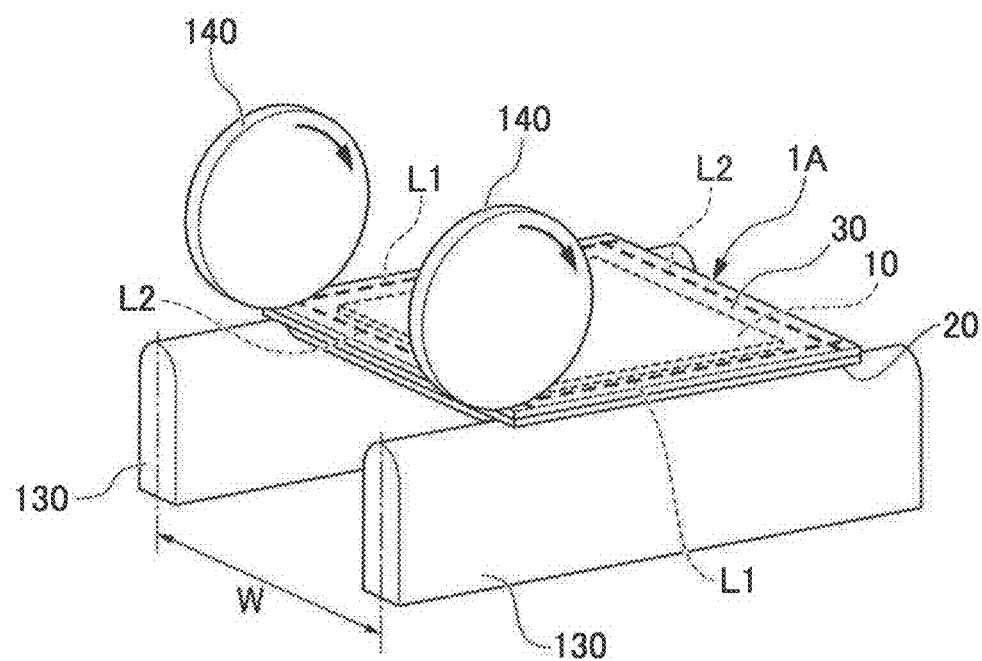
FIG. 5 is a schematic perspective view of the seam welding device 100.

As illustrated in FIG. 4 and FIG. 5, the lower electrode 130 is formed in a rail shape (block shape) and is arranged on a floor surface 101. The plurality of lower electrodes 130 extend in parallel to each other. In the present embodiment, two lower electrodes 130 are arranged. In the present embodiment, the lower electrode 130 is arranged on the floor surface 101 via the second inter-electrode distance variable mechanism 180 (described later) arranged on the floor surface 101.

The upper electrode 140 is arranged above each lower electrode 130. The upper electrode 140 is formed in a disk shape and is arranged such that the circumferential direction (rotation direction) of the disk is along the direction in which the lower electrode 130 extends.

The upper electrode support member 150 rotatably supports the upper electrode 140 in the direction in which the lower electrode 130 extends. In the present embodiment, the upper electrode support member 150 is arranged beside each upper electrode 140 and is provided with a shaft member 151 connected to the rotation center of the upper electrode 140 and extending in the horizontal direction and a main body portion 152 rotatably supporting the shaft member 151.

The upper electrode moving mechanism 160 moves the upper electrode support member 150 in the direction in which the lower electrode 130 extends. The upper electrode moving mechanism 160 includes, for example, a rail member arranged above the upper electrode support member 150, extending in the same direction as the direction in which the lower electrode 130 extends, and supporting the upper electrode support member 150.

The first inter-electrode distance variable mechanism 170 varies the distance between the lower electrode 130 and the upper electrode 140. The first inter-electrode distance variable mechanism 170 includes, for example, a piston rod 171 and a cylinder (not illustrated) advancing and retracting the piston rod 171 upwards and downwards. The lower end side of the piston rod 171 is connected to the upper electrode support member 150 and the upper end side of the piston rod 171 is connected to the upper electrode moving mechanism 160.

The second inter-electrode distance variable mechanism 180 is interposed between the lower electrode 130 and a bottom surface and varies distances W between the plurality of lower electrodes 130 and between the plurality of upper electrodes 140. The second inter-electrode distance variable mechanism 180 is provided with a base 181 installed on the floor surface 101 and a fixed table 182 and a movable table 183 arranged on the upper surface of the base 181.

The base 181 is fixed to the floor surface 101. The fixed table 182 is fixed to the upper surface of the base 181. The movable table 183 is installed so as to be slidable with respect to the base 181.

In the present embodiment, one of the two lower electrodes 130 is fixed to the upper surface of the fixed table 182 and the other is fixed to the upper surface of the movable table 183. In addition, one of the two upper electrode moving mechanisms 160 and one of the two first inter-electrode distance variable mechanisms 170 are fixed to the upper surface of the fixed table 182 via a support frame 190 and the others are fixed to the upper surface of the movable table 183 via the support frame 190.

The movable table 183 slides in a direction X, which is orthogonal to the direction in which the lower electrode 130 extends. As a result, it is possible to change the distance W between the two lower electrodes 130 and the distance W between the two upper electrodes.

(Vacuum Device 3)

Figure 6:
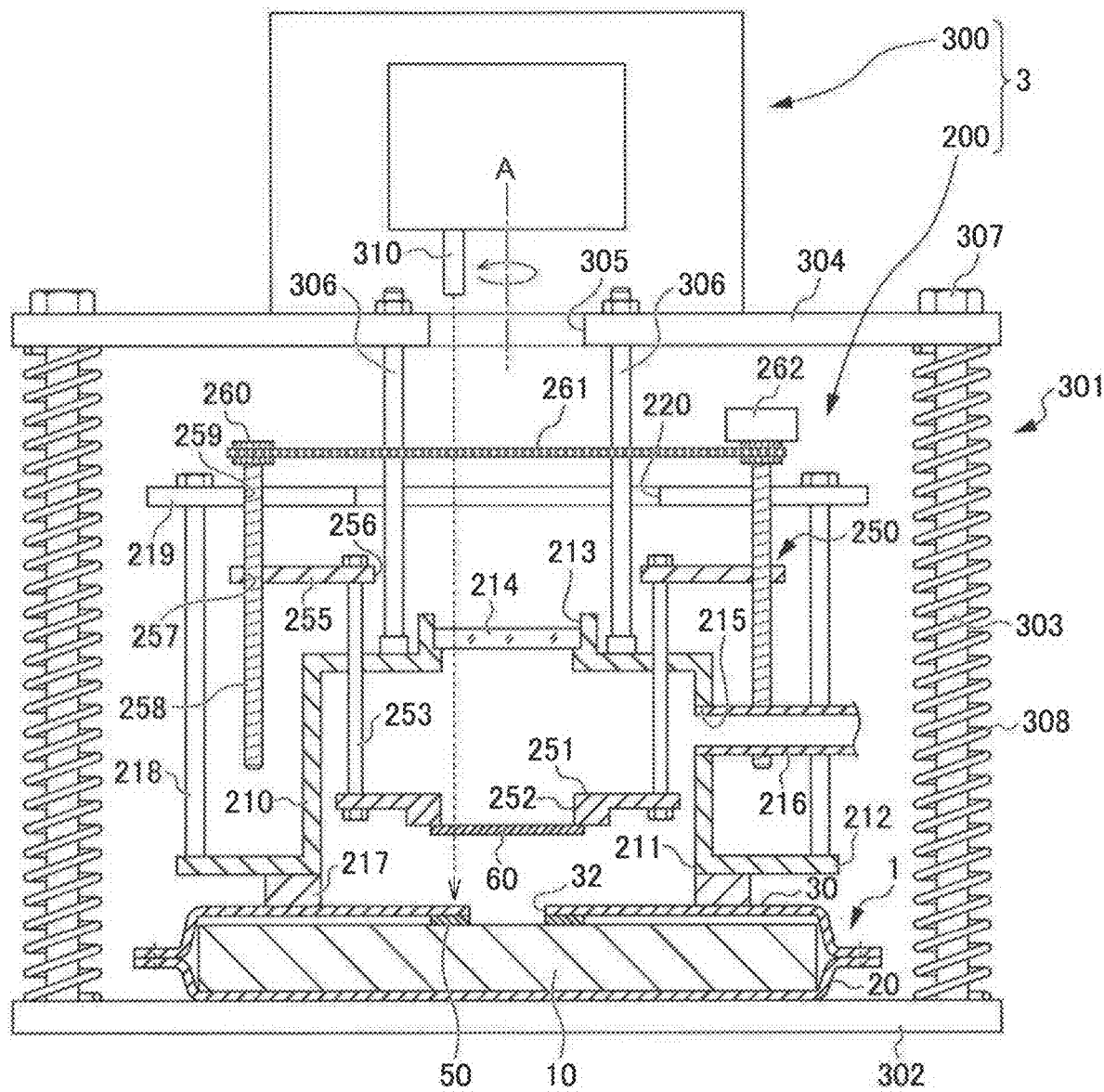
FIG. 6 is a diagram illustrating a vacuum device 3 of the vacuum insulation panel manufacturing device 2.

The vacuum device 3 of the vacuum insulation panel manufacturing device 2 will be described below. FIG. 6 is a diagram illustrating the vacuum device 3 of the vacuum insulation panel manufacturing device 2. The vacuum device 3 is provided with the vacuum suction unit 200 and the laser welding unit 300. In the drawing, a partial cross section is illustrated for easy understanding and the whole is not necessarily illustrated in cross section.

(Vacuum Suction Unit 200)

The vacuum suction unit 200 is provided with a chamber 210 having an open bottom portion and a sealing member lifting mechanism 250 provided in the chamber 210.

(Chamber 210)

The chamber 210 has an open bottom portion (opening portion 211). On the outer periphery of the opening portion 211, a packing 217 is arranged over the entire circumference in the circumferential direction. Sealability is maintained and evacuation is possible by the packing 217 and the surface of the second metal plate 30 being brought into close contact with each other.

A flange portion 212 extending to the outer diameter side is provided on the outer periphery of the bottom portion of the chamber 210. A pillar member 218 extending upwards is fixed to the outer periphery of the flange portion 212. In FIG. 3, two pillar members 218 are attached in bilateral symmetry. In the embodiment, however, the pillar members 218 are attached in three places evenly in the circumferential direction.

The upper end of the pillar member 218 is fixed to an upper plate 219 holding the sealing member lifting mechanism 250. The upper plate 219 is annular and a circular upper plate opening portion 220 is provided in the middle portion of the upper plate 219.

A window 213 is provided in the middle of the upper portion of the chamber 210, and quartz glass 214 is attached to the window 213. A chamber evacuation hole 215 is provided in a side portion of the chamber 210. A pipe 216 is connected to the chamber evacuation hole 215, and a vacuum pump (not illustrated) is connected to the pipe 216.

The sealing member lifting mechanism 250 is provided with a holding plate 251 holding the sealing member 60, a support rod 253 supporting the holding plate 251 at the lower end, a lifting plate 255 to which the upper end of the support rod 253 is fixed, a lifting rod 258 screwed with the lifting plate 255, and a chain gear 260, a chain 261, and a rotary knob 262 rotating the lifting rod.

(Holding Plate 251)

The holding plate 251 has an annular shape with a hole 252 in the middle, and a magnet is attached inside. As described above, the sealing member 60 is made of a magnetic body, and thus the holding plate 251 is capable of holding the sealing member 60 with a magnetic force.

Incidentally, the magnetic force of the holding plate 251 allows a worker to manually attach and detach the sealing member 60 from the holding plate 251 with ease.

The support rod 253 is attached to the holding plate 251 in three places along the circumference. In FIG. 3, two support rods 253 are attached in bilateral symmetry. In the embodiment, however, the support rods 253 are attached in three places evenly in the circumferential direction. The support rod 253 extends upwards and has an upper end attached to the lifting plate 255.

The support rod 253 is inserted, so as to be movable up and down while maintaining the airtight state of the chamber 210, in three places around the quartz glass 214 on the upper surface of the chamber 210.

(Lifting Plate 255)

The lifting plate 255 has an annular shape with a hole 256 in the middle. A screw hole 257 is provided on the outer periphery side of the place where the support rod 253 supporting the holding plate 251 is fixed.

In FIG. 3, the screw hole 257 is provided in two places in bilateral symmetry. In the embodiment, however, the screw holes 257 are attached in three places evenly in the circumferential direction.

The lifting rod 258 having a threaded outer periphery is screwed into the screw hole 257 of the lifting plate. In FIG. 3, the lifting rod 258 is also provided in two places in bilateral symmetry. In the embodiment, however, the lifting rods 258 are provided in three places evenly in the circumferential direction.

The lifting rod 258 passes through a hole 259 formed in the upper plate 219 and is held so as to be rotatable and so as to be incapable of moving up and down with respect to the upper plate 219.

The chain gear 260 is attached to the upper end of the lifting rod 258. The chain 261 is bridged between the chain gears 260 of the three lifting rods 258. The chain 261 meshes with the gear of the chain gear 260. The rotary knob 262 is attached to the portion of one of the lifting rods 258 that is on the chain gear 260.

(Laser Welding Unit 300)

A frame member 301 is arranged so as to cover the outside of the above-described vacuum suction unit 200. The frame member 301 is provided with a base member 302, a pillar member 303 extending upwards from the outer peripheral portion of the base member 302, and an upper frame portion 304 fixed to the upper end of the pillar member 303. The frame member 301 is fixed with the vacuum suction unit 200 by a connecting rod 306.

By the action of a nut 307 and a spring 308 fixing the upper frame portion 304 and the pillar member 303, the upper frame portion 304 moves up and down when the nut 307 is rotated in the clockwise direction or the counterclockwise direction. Possible as a result are fixing of the vacuum insulation panel 1 before sealing and opening of the vacuum insulation panel 1 after sealing. A circular hole 305 is provided in the middle of the upper frame portion 304. The laser welding unit 300 is arranged on the upper frame portion 304.

The laser welding unit 300 is provided with a laser irradiation unit 310. The laser irradiation unit 310 is rotatable around an axis A of the vacuum device 3. In other words, the laser irradiation unit 310 is movable along a circumference with a predetermined diameter around the axis A.

The upper plate opening portion 220, the window 213, the hole 252, and the quartz glass 214 are arranged around the axis A. The laser light that is emitted from the laser irradiation unit 310 rotatable around the axis A passes through the upper plate opening portion 220, the quartz glass 214, and the hole 252, and then the sealing member 60, the outer peripheral portion of the evacuation port 32 of the second metal plate 30, and the backing member 50 are welded.

Incidentally, the diameters of the upper plate opening portion 220, the window 213, the hole 252, and the quartz glass 214 exceed the diameter of the evacuation port 32 by a certain width and are similar to, for example, the outer diameter of the backing member 50. As a result, the optical path of the laser light is not hindered during laser welding of the sealing member 60, the second metal plate 30, and the backing member 50 as described later.

(Method for Manufacturing Vacuum Insulation Panel 1)

A method for manufacturing the vacuum insulation panel 1 by using the vacuum insulation panel manufacturing device 2 will be described below. FIG. 7 is a diagram illustrating the method for manufacturing the vacuum insulation panel 1 by using the vacuum insulation panel manufacturing device 2.

The method for manufacturing the vacuum insulation panel 1 includes a stacking step, a seam welding step, an evacuating step, a laser welding step, and a cutting step.

(Stacking Step)

Figure 7A:
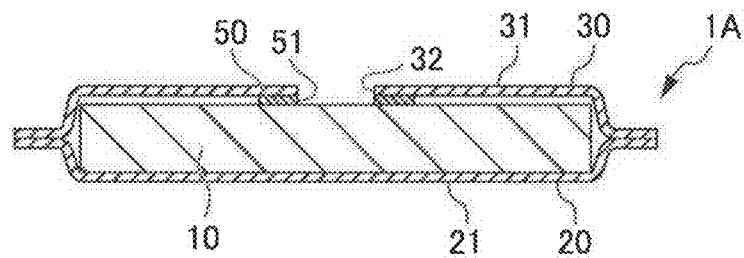
FIG. 7A through FIG. 7E are diagrams illustrating a method for manufacturing the vacuum insulation panel 1 of the first embodiment by using the vacuum insulation panel manufacturing device 2.

FIG. 7A is a diagram illustrating the stacking step. First, the first metal plate 20 in which the bulging portion 21 is formed is arranged such that the bulging portion 21 faces downwards, and the core member 10 is accommodated in the recessed portion of the upper surface of the first metal plate 20.

The backing member 50 is placed on the core member 10. The backing member 50 is arranged so as to be positioned substantially in the middle of the core member 10.

Subsequently, the second metal plate 30 in which the bulging portion 31 is formed is stacked on the first metal plate 20, the core member 10, and the backing member 50 such that the bulging portion 31 faces upwards. A laminated body 1A is formed as a result.

At this time, adjustment is performed such that the opening portion 51 of the backing member 50 and the evacuation port 32 of the second metal plate 30 are aligned.

(Seam Welding Step)

Figure 7B:
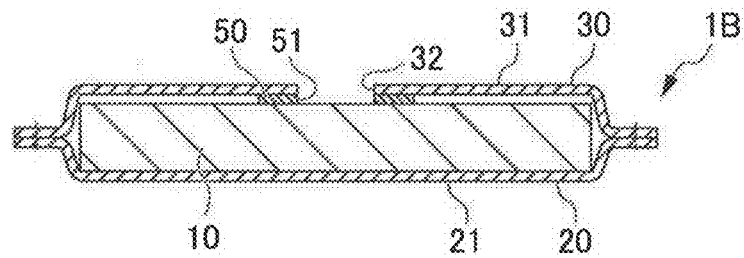

FIG. 7B is a diagram illustrating the seam welding step. In the seam welding step, seam welding is performed on the edge portions (four sides) of the first metal plate 20 and the second metal plate 30 in the laminated body 1A manufactured in the stacking step. The edge portions are parts outside the bulging portions 21 and 31, and the core member 10 is not included in the edge portions. This seam welding step is performed in the atmosphere.

The seam welding is performed by the seam welding device 100 illustrated in FIG. 4 and FIG. 5.

First, the laminated body 1A manufactured in the stacking step is set in the seam welding device 100.

Specifically, the movable table 183 in FIG. 4 is slid until the distance between the two lower electrodes 130 matches the distance between two sides L1 (illustrated in FIG. 5) to be seam welded.

Then, the laminated body 1A is arranged such that the two sides L1 to be seam welded are positioned on the upper surface of the lower electrode 130.

Then, the two sides L1 are seam welded by the seam welding device 100.

Specifically, first, the two upper electrodes 140 are lowered by the first inter-electrode distance variable mechanism 170 and the first metal plate 20 and the second metal plate 30 are sandwiched between the upper electrodes 140 and the lower electrodes 130.

The first metal plate 20 and the second metal plate 30 are seam welded while the upper electrode moving mechanism 160 simultaneously rotates and moves the two upper electrodes 140 in the direction in which the lower electrode 130 extends.

As a result, the two facing sides L1 of the first metal plate 20 and the second metal plate 30 are seam welded at the same time.

Next, the seam welding device 100 seam welds two sides L2, which are orthogonal to the side L1, similarly to the above L1. At this time, the welding line of the side L1 and the welding line of the side L2 are allowed to intersect.

As a result, the two facing sides L1 of the first metal plate 20 and the second metal plate 30 and the facing sides L2 orthogonal to the sides L1 are seam welded.

As a result of the above seam welding step, a panel 1B that is not evacuated inside is manufactured.

(Evacuating Step)

Figure 7C:
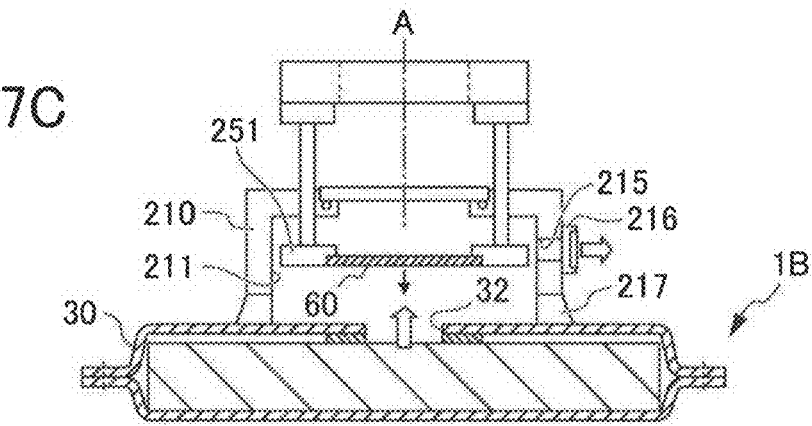

FIG. 7C is a diagram illustrating the evacuating step.

First, the sealing member 60 is mounted on the holding plate 251. At this time, the holding plate 251 is positioned above the opening portion 211 of the chamber 210. In addition, the center of the sealing member 60 is allowed to come to the axis A. At this time, the sealing member 60, which is made of a magnetic body, can be easily attached and detached by the magnetic force of the holding plate 251.

The panel 1B resulting from the seam welding step and not evacuated inside is arranged under the chamber 210 on the base member 302 of the frame member 301. Then, fixing is performed by means of the frame member 301 and tightening of the nut 307. At this time, the center of the evacuation port 32 of the panel 1B is set so as to be on the axis A of the device, and fixing is performed such that the panel 1B is pressed down with uniformity.

At this time, sealability with respect to the upper surface of the second metal plate 30 of the panel 1B is excellent as the packing 217 is attached to the bottom portion of the chamber 210.

The vacuum pump (not illustrated) that is connected to the chamber evacuation hole 215 of the chamber 210 is operated. Evacuation is performed to the target vacuum degree in the chamber 210 or less.

Incidentally, when the evacuation is performed, the sealing member 60 may be allowed to approach the evacuation port 32 by being temporarily lowered and the evacuation may be initiated in that state. At the beginning of the evacuation, turbulence may occur and the glass wool or the like of the core member 10 may be scattered. In the initial stage of the evacuation that may entail turbulence as described above, the sealing member 60 and the evacuation port 32 are allowed to be in proximity to each other in terms of distance, and thus airflow stabilization is achieved and the possibility of such content scattering and the like is reduced. After the airflow is stabilized, the sealing member 60 is raised so as not to hinder the evacuation.

From the viewpoint of preventing glass wool scattering attributable to turbulence, the distance between the evacuation port 32 and the sealing member 60 at the beginning of the evacuation is preferably 0.5 mm to 3.0 mm.

Figure 7D:
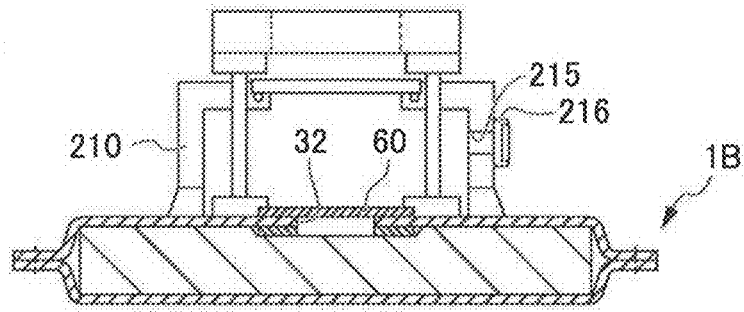
Figure 7E:
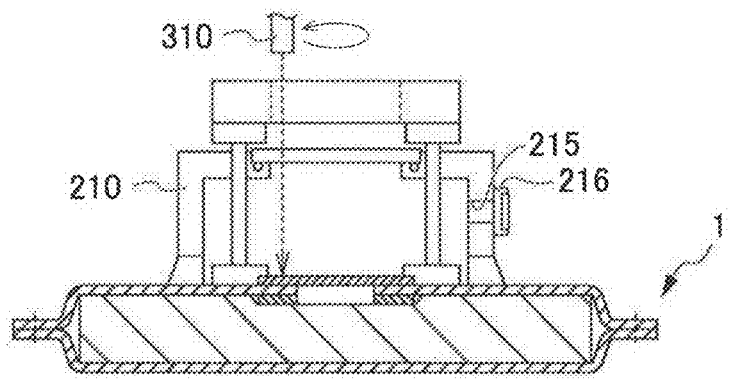

After the target vacuum degree is reached, the sealing member 60 is lowered and the evacuation port 32 is blocked as illustrated in FIG. 7D. Here, the lowering of the sealing member 60 is performed as follows.

The rotary knob 262 illustrated in FIG. 6 is rotated. Then, the chain 261 transmits a rotational force, and each of the chain gears 260 rotates. Once the chain gears 260 rotate, the lifting rods 258 connected to the chain gears 260 rotate as well, and the lifting plate 255 screwed with the screw portions of the lifting rods 258 moves up and down. Once the lifting plate 255 is lowered, the support rod 253 supported by the lifting plate 255 and the holding plate 251 supported by the lower end of the support rod 253 are lowered, and the sealing member 60 held by the holding plate 251 is lowered as well.

The sealing member 60 is lowered in this manner and pressed toward the evacuation port 32 side. As a result of this pressing, the second metal plate 30 is sandwiched between the backing member 50 inserted in the panel 1B and the lowered sealing member 60. Accordingly, the part where the lowered sealing member 60, the second metal plate 30, and the backing member 50 are stacked in three sheets is restrained without a gap.

(Laser Welding Step)

Subsequently, the laser irradiation unit 310 of the laser welding unit 300 emits laser to the part where the sealing member 60, the second metal plate 30, and the backing member 50 are stacked in three sheets. The laser emission is performed over the entire circumference around the evacuation port 32 by the laser irradiation unit 310 being rotated.

Here, the backing member 50 is arranged besides the lowered sealing member 60 and the second metal plate 30. The second metal plate 30 is thin. Accordingly, there is a possibility of melting down in a case where only the sealing member 60 and the second metal plate 30 are used during the laser welding. In the present embodiment, however, the possibility of melting down is low since the backing member 50 is arranged as well.

The part where the sealing member 60, the second metal plate 30, and the backing member 50 are stacked in three sheets is circumferentially welded by the laser light emitted by the laser irradiation unit 310, and thus the internal space in which the core member 10 sandwiched by the first metal plate 20 and the second metal plate 30 is arranged can be completely sealed. The vacuum insulation panel 1 is completed as a result.

The vacuum is released after the part where the lowered sealing member 60, the second metal plate 30, and the backing member 50 are stacked in three sheets is laser welded. The holding plate 251 is raised by the rotary knob 262 being rotated in the direction that is opposite to the lowering direction.

(Cutting Step)

In the cutting step, the vacuum insulation panel 1 is removed from the vacuum device 3, by the nut 307 of the frame member 301 being loosened, with the internal space sealed through the laser welding step. Then, the surplus part in the outer peripheral portion of the vacuum insulation panel 1 is cut and the vacuum insulation panel 1 is completed.

Example

Under the following conditions, the vacuum insulation panel 1 was actually manufactured by means of the above manufacturing method.

As the core member 10, a glass wool with a basis weight of approximately 1,200 g/m$^2$ was used and an object was used that has a dimension capable of filling the inner surface side of the bulging portion to be described later without gaps when the first metal plate 20 and the second metal plate 30 are stacked.

A steel plate of SUS 304 was used as the first metal plate 20 and the second metal plate 30. The dimensions are 220 mm×220 mm×0.1 mm. Then, the bulging portions 21 and 31 of 190 mm×190 mm×5.0 mm were produced by press molding in the first metal plate 20 and the second metal plate 30, respectively.

The evacuation port 32 in the middle of the bulging portion 31 of the second metal plate 30 has a diameter of 20 mm.

SUS 430 as a magnetic body was used for the backing member 50 and the sealing member 60. The dimensions are 0.3 mm in thickness and 40 mm in outer diameter dimension. The opening portion 51 of the backing member 50 has a diameter of 20 mm as in the case of the evacuation port 32 provided in the second metal plate 30.

A single phase AC-type device was used as the seam welding device 100. The upper electrode, which is 100 mm in diameter and 4 mm in thickness, has a disk shape with a flat electrode tip portion. The lower electrode has a block shape and has a thickness of 4 mm, a height of 50 mm, a length of 250 mm, and an electrode tip portion curvature of 20 R. The welding conditions are an applied pressure of 250 N, a welding speed of 1 m/min, a welding current of 1.6 kA, and an energization time ON/OFF ratio of 3 ms/2 ms.

The outer diameter of the opening portion 211 of the chamber 210 is approximately 220 mm, and the packing 217 is a silicone rubber packing with a thickness of 20 mm.

Used as the quartz glass 214 was a circular quartz glass with an outer diameter of 40 mm through which a laser beam with a wavelength of 1 μm is capable of passing.

A fiber laser welding machine manufactured by IPG was used as the laser welding unit 300, and the welding conditions are a welding speed of 10 m/min, an output of 700 W, a laser spot diameter of ϕ0.2 mm, and pulse-type laser oscillation.

Under the above conditions, the vacuum insulation panel 1 was manufactured and its performance was evaluated.

In evaluating the performance of the vacuum insulation panel 1, a thermal conductivity measuring device (model: FOX200) manufactured by EKO Instruments Co., Ltd. was used for thermal conductivity measurement and evaluation under a condition that the middle portion of the vacuum insulation panel 1 has an average temperature of 25° C.

Three units of the vacuum insulation panel 1 were produced as prototypes under the same conditions and thermal conductivity measurement was carried out. As a result, the thermal conductivity of every sample was within a range of 2.5 to 3.0 mW/m·K, and it was confirmed that trial production of the stainless steel-based vacuum insulation panel 1 excellent in heat insulation performance and heat resistance is possible.

(Effects)

(1) According to the method for manufacturing the vacuum insulation panel 1 of the present embodiment, the backing member 50 is arranged inside the part of the evacuation port 32 of the second metal plate 30. Accordingly, the possibility of melting down attributable to laser welding is low, and laser welding to the part where the backing member 50 is arranged becomes possible. Therefore, sealing by the sealing member 60 using the laser welding of the evacuation port 32 becomes possible.

The laser welding does not require heating of a welding spot such as brazing, and irradiation can be performed from the outside of the chamber 210 through the quartz glass 214. Accordingly, a heating unit or the like does not have to be arranged in the chamber 210. The chamber 210 can be reduced in size, and the manufacturing cost of the vacuum insulation panel 1 can be reduced.

(2) Since the chamber 210 can be reduced in size as described above, it is possible to achieve a compact shape in which arrangement is performed so as to cover a part of the panel 1B that includes the evacuation port 32. As a result, evacuation can be facilitated and can be completed with little effort, and cost reduction can be achieved along with a shorter operation time.

(3) It is possible to lower the sealing member 60 and press the sealing member 60 to the evacuation port 32 side. Accordingly, the second metal plate 30 can be sandwiched between the backing member 50 inserted in the panel 1B and the lowered sealing member 60. As a result, the part where the lowered sealing member 60, the second metal plate 30, and the backing member 50 are stacked in three sheets can be restrained without any gap, and sealing by subsequent laser irradiation is possible.

(4) Evacuation is performed from the part where the core member 10 is arranged between the first metal plate 20 and the second metal plate 30. Accordingly, blocking of an evacuation passage attributable to contact between the first metal plate 20 and the second metal plate 30 resulting from evacuation does not occur.

(5) Since the sealing member 60 is made of a magnetic body and held by the holding plate 251 including a magnet, attachment and detachment are facilitated.

(6) The laser irradiation unit 310 is rotated around the axis A. In other words, circular welding can be performed on the outer periphery of the evacuation port 32 since the laser irradiation unit 310 moves along a circumference that has a predetermined diameter around the axis A.

(7) Since the packing 217 is attached to the bottom portion of the chamber 210, sealability with respect to the upper surface of the second metal plate 30 of the panel 1B is excellent.

Second Embodiment

Next, a second embodiment of a method for manufacturing a vacuum insulation panel 11 of the present invention and the vacuum insulation panel 11 manufactured by the manufacturing method will be described with reference to accompanying drawings. FIG. 8 is a cross-sectional view of the vacuum insulation panel 11 of the second embodiment. FIG. 9 is an exploded view of the vacuum insulation panel 11 of the second embodiment.

The second embodiment is different from the first embodiment in that a reinforcing material 50A is provided outside the part where the evacuation port 32 of the second metal plate 30 is provided instead of the backing member 50, which is arranged inside the second metal plate 30 across the evacuation port 32 in the first embodiment. Like parts are denoted by like reference numerals, and description thereof is omitted.

(Overall Configuration)

As illustrated in FIG. 8, the annular reinforcing material 50A having a circular opening 51A in the middle is arranged outside the part of the second metal plate 30 where the evacuation port 32 is provided, and the entire circumferences of the reinforcing material 50A and the second metal plate 30 are welded such that the opening 51A of the reinforcing material 50A and the central portion of the evacuation port 32 of the second metal plate 30 are aligned.

The circular sealing member 60 is arranged outside the reinforcing material 50A, and the opening 51A is sealed by the sealing member 60. The reinforcing material 50A and the sealing member 60 are laser welded as described later, and the inside of the vacuum insulation panel 11 of the panel 1 is maintained in a vacuum state.

(Reinforcing Material 50A and Sealing Member 60)

The reinforcing material 50A has an annular shape, and the opening 51A having the same diameter as the evacuation port 32 provided in the second metal plate 30 is provided in the middle of the reinforcing material 50A.

The sealing member 60 has a disk shape. In the embodiment, the sealing member 60 has the same diameter as the reinforcing material 50A. In the embodiment, SUS 430 as a magnetic body is used as the reinforcing material 50A and the sealing member 60. However, the present invention is not limited thereto, and the reinforcing material 50A may be another metal member without having to be limited to the magnetic body and the sealing member 60 may be another magnetic body.

Since the structures of the vacuum insulation panel manufacturing device 2, the seam welding device 100, the vacuum device 3, and the laser welding unit 300 are the same as those of the first embodiment, description thereof will be omitted.

Figure 10:
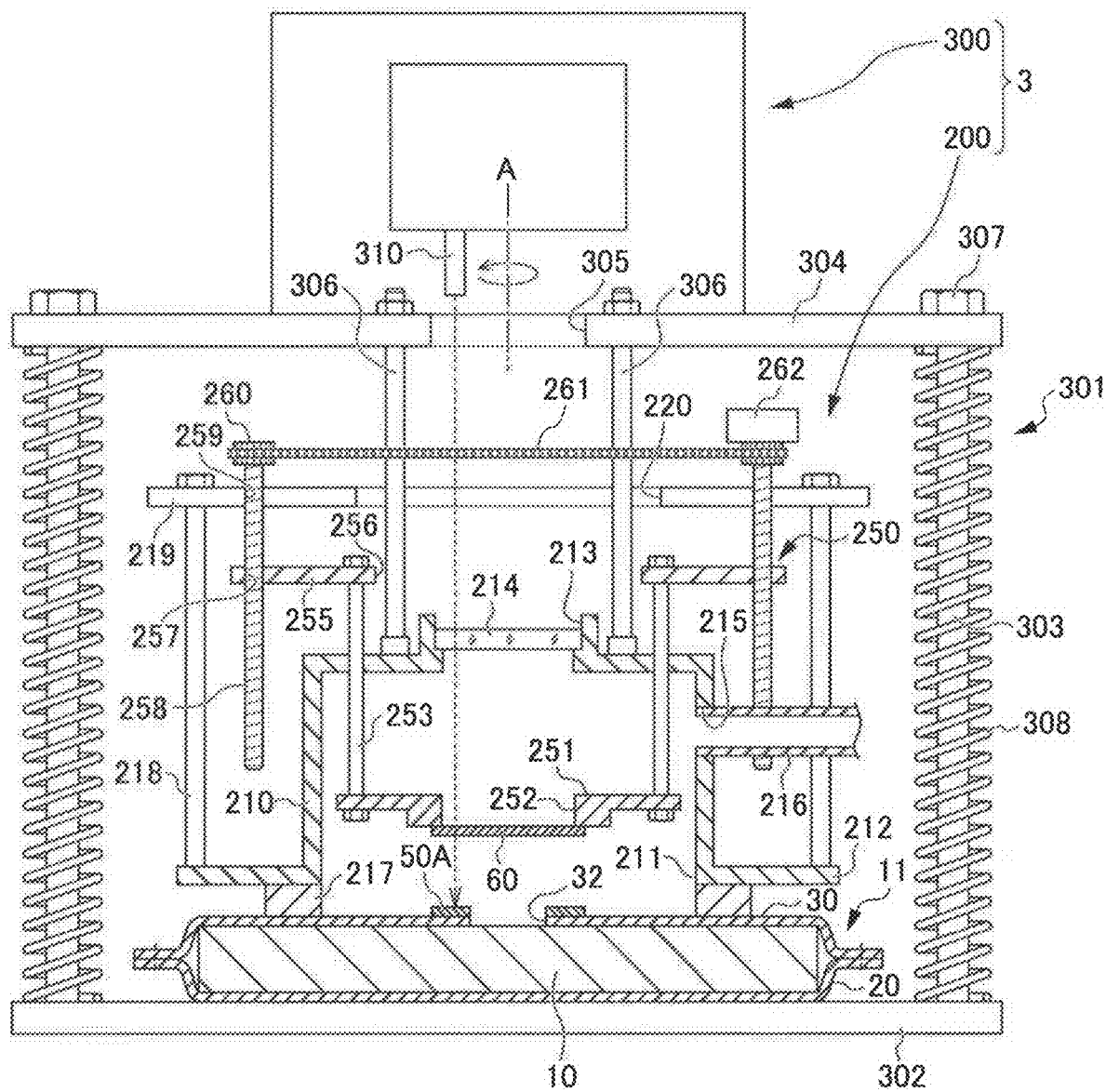
FIG. 10 is a diagram illustrating the vacuum device 3 of the vacuum insulation panel manufacturing device 2 in which the vacuum insulation panel 11 of the second embodiment is arranged.

Illustrated in FIG. 10 are the method for manufacturing the vacuum insulation panel 11 of the second embodiment and the vacuum device 3 where the vacuum insulation panel 11 manufactured by the manufacturing method is arranged.

The upper plate opening portion 220, the window 213, the hole 252, and the quartz glass 214 are arranged around the axis A. The laser light that is emitted from the laser irradiation unit 310 rotatable around the axis A passes through the upper plate opening portion 220, the quartz glass 214, and the hole 252, and then the sealing member 60 and the reinforcing material 50A are welded.

Incidentally, the diameters of the upper plate opening portion 220, the window 213, the hole 252, and the quartz glass 214 exceed the diameter of the evacuation port 32 by a certain width and are similar to, for example, the outer diameter of the reinforcing material 50A. As a result, the optical path of the laser light is not hindered during laser welding of the sealing member 60 and the reinforcing material 50A as described later.

(Method for Manufacturing Vacuum Insulation Panel 11)

The method for manufacturing the vacuum insulation panel 11 of the second embodiment by using the vacuum insulation panel manufacturing device 2 will be described below. FIG. 11 is a diagram illustrating the method for manufacturing the vacuum insulation panel 11 by using the vacuum insulation panel manufacturing device 2.

The method for manufacturing the vacuum insulation panel 11 includes a stacking step including welding of the reinforcing material 50A and the second metal plate 30, a seam welding step, an evacuating step, a laser welding step, and a cutting step.

(Stacking Step)

Figure 11A:
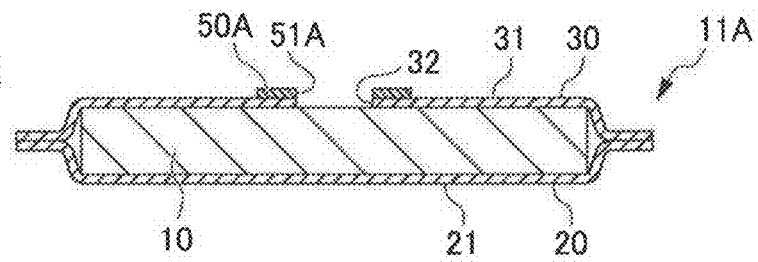
FIG. 11A through FIG. 11E are diagrams illustrating a method for manufacturing the vacuum insulation panel 11 of the second embodiment by using the vacuum insulation panel manufacturing device 2.

FIG. 11A is a diagram illustrating the stacking step.

First, the first metal plate 20 in which the bulging portion 21 is formed is arranged such that the bulging portion 21 faces downwards, and the core member 10 is accommodated in the recessed portion of the upper surface of the first metal plate 20.

The second metal plate 30 to which the reinforcing material 50A is attached by welding in advance is stacked on the core member 10 such that the bulging portion 31 faces upwards. The laminated body 1A is formed as a result. At this time, the reinforcing material 50A is attached to the bulging portion side (outer surface) of the second metal plate 30, and the opening 51A of the reinforcing material 50A and the evacuation port 32 of the second metal plate 30 are circumferentially welded so as to substantially coincide with each other in terms of hole and center positions. Accordingly, in the evacuating step in the manufacturing of the vacuum insulation panel 11 of the panel 1, evacuation is performed from the opening 51A of the reinforcing material 50A.

Incidentally, in the present embodiment, the second metal plate 30 and the reinforcing material 50A are welded by laser welding. Accordingly, it is possible to prevent misalignment and so on between the evacuation port 32 and the opening 51A in the stacking step, and alignment does not have to be performed in the final laser sealing step.

(Seam Welding Step)

Figure 11B:
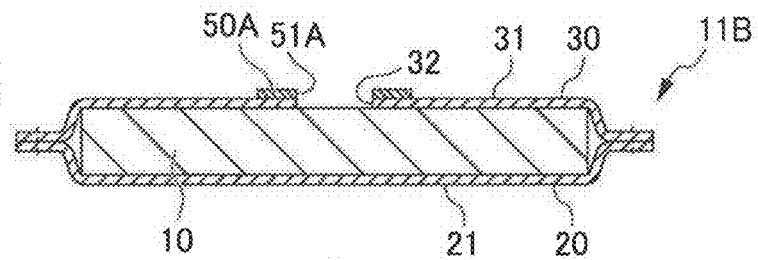

FIG. 11B is a diagram illustrating the seam welding step. The seam welding step is identical to that of the first embodiment.

(Evacuating Step)

Figure 11C:
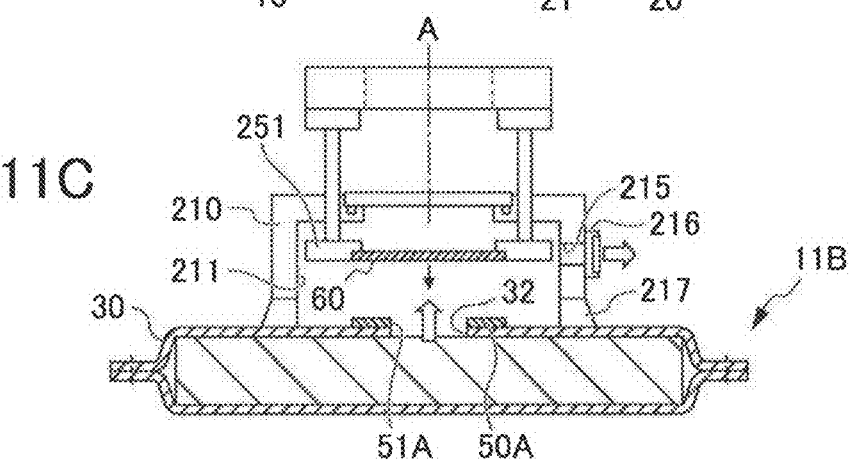

FIG. 11C is a diagram illustrating the evacuating step. The evacuating step is almost identical to that of the first embodiment. Only its difference from the first embodiment will be described.

Incidentally, when the evacuation is performed, the valve of the vacuum pump may be temporarily squeezed for a decrease in intake air amount, the sealing member 60 may be allowed to approach the opening 51A of the reinforcing material 50A by being temporarily lowered, and the evacuation may be initiated in that state.

Figure 11D:
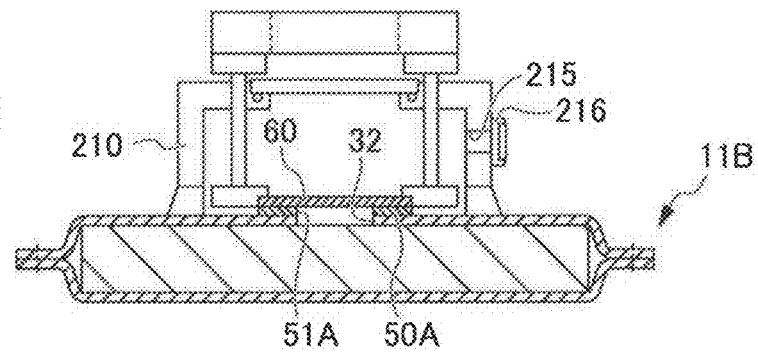
Figure 11E:
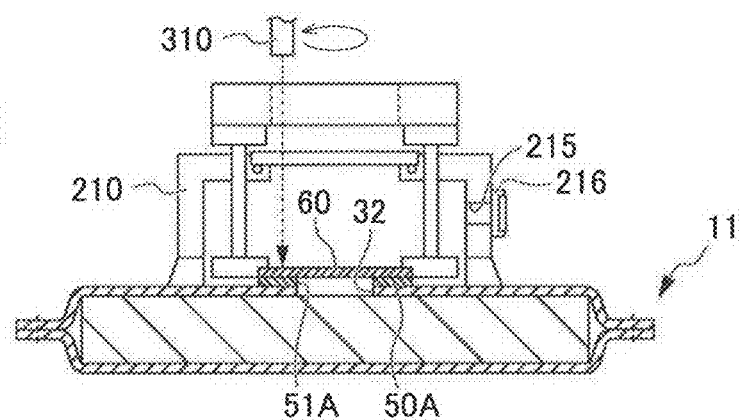

Incidentally, as illustrated in FIG. 11D, when the sealing member 60 is lowered and the opening 51A is blocked, the lowered sealing member 60 is pressed to the reinforcing material 50A side. As a result of this pressing, the lowered sealing member 60 and the part where the reinforcing material 50A and the second metal plate 30 are stacked are pressed without a gap.

(Laser Welding Step)

The laser welding step is almost identical to that of the first embodiment. Only its difference from the first embodiment will be described.

The laser irradiation unit 310 of the laser welding unit 300 irradiates the sealing member 60 and the reinforcing material 50A with laser. The laser irradiation is performed over the entire circumference around the evacuation port 32 by the laser irradiation unit 310 being rotated.

Although the second metal plate 30 is arranged besides the lowered sealing member 60 and the reinforcing material 50A here, in this step, only the sealing member 60 and the reinforcing material 50A are joined and laser welding is performed under the condition that the second metal plate 30 does not melt.

As described above, the second metal plate 30 and the reinforcing material 50A are joined in advance in the stacking step. Accordingly, in this step, the opening 51A of the reinforcing material 50A has only to be sealed with the sealing member 60.

The sealing member 60, the reinforcing material 50A, and the second metal plate 30 can be stacked and welded in three sheets. Still, this case is not preferable in that the second metal plate 30 is thin and easily penetrated and the laser may reach the core member 10 inside the panel to cause seizure damage. In the present embodiment, the final sealing is two-sheet lap welding of the sealing member 60 and the reinforcing material 50A and the plate thickness is thick, and thus stable sealing can be achieved by the laser welding.

The part where the sealing member 60 and the reinforcing material 50A are stacked is circumferentially welded by the laser light emitted by the laser irradiation unit 310, and thus the internal space in which the core member 10 sandwiched by the first metal plate 20 and the second metal plate 30 is arranged can be completely sealed. The vacuum insulation panel 11 is completed as a result.

The vacuum is released after the lowered sealing member 60 and the reinforcing material 50A are laser welded. The holding plate 251 is raised by the rotary knob 262 being rotated in the direction that is opposite to the lowering direction.

(Cutting Step)

The cutting step is identical to that of the first embodiment.

Example

The vacuum insulation panel 11 that has a size of 900 mm×900 mm×a thickness of 5.0 mm was actually manufactured under the following conditions and by the manufacturing method described above. As the core member 10, a glass wool with a basis weight of approximately 1,200 g/m² was used and an object was used that has a dimension capable of filling the inner surface side of the bulging portion to be described later without gaps when the first metal plate 20 and the second metal plate 30 are stacked.

A steel plate of SUS 304 was used as the first metal plate 20 and the second metal plate 30. The dimensions are 920 mm×920 mm×0.1 mm. The bulging portions 21 and 31 of 890 mm×890 mm×5.0 mm were produced by press molding in the first metal plate 20 and the second metal plate 30, respectively.

The evacuation port 32 in the middle of the bulging portion 31 of the second metal plate 30 has a diameter of 20 mm.

SUS 430 as a magnetic body was used as the reinforcing material 50A and the sealing member 60. When it comes to dimensions, the reinforcing material 50A has a thickness of 0.3 mm and an outer diameter dimension of 120 mm and the sealing member 60 has a thickness of 0.3 mm and an outer diameter dimension of 60 mm. The opening 51A of the reinforcing material 50A has a diameter of 20 mm as in the case of the evacuation port 32 provided in the second metal plate 30.

A single phase AC-type device was used as the seam welding device 100. The upper electrode, which is 100 mm in diameter and 4 mm in thickness, has a disk shape with a flat electrode tip portion. The lower electrode has a disk shape and has a thickness of 4 mm, a height of 50 mm, a length of 250 mm, and an electrode tip portion curvature of 20 R. The welding conditions are an applied pressure of 250 N, a welding speed of 1 m per minute, a welding current of 1.6 kA, and an energization time ON/OFF ratio of 3 ms/2 ms.

The outer diameter of the opening portion 211 of the chamber 210 is approximately 100 mm, and the packing 217 is a silicone rubber packing with a thickness of 20 mm.

Used as the quartz glass 214 was a circular quartz glass with an outer diameter of 40 mm through which a laser beam with a wavelength of 1 µm is capable of passing.

A fiber laser welding machine manufactured by IPG was used as the laser welding unit 300, and the welding conditions are a welding speed of 10 m/min, an output of 1 kW, a laser spot diameter of ϕ0.2 mm, and continuous laser oscillation.

Under the above conditions, the vacuum insulation panel 11 was manufactured and its performance was evaluated.

In evaluating the performance of the vacuum insulation panel 11, a thermal conductivity measuring device (model: FOX200) manufactured by EKO Instruments Co., Ltd. was used for thermal conductivity measurement and evaluation under a condition that the middle portion of the vacuum insulation panel 11 has an average temperature of 25° C.

Three units of the vacuum insulation panel 11 were produced as prototypes under the same conditions and thermal conductivity measurement was carried out. As a result, the thermal conductivity of every sample was within a range of 2.5 to 3.0 mW/m·K, and it was confirmed that trial production of the stainless steel-based vacuum insulation panel 11 excellent in heat insulation performance and heat resistance is possible.

(Effects)

The second embodiment has the following effects in addition to the effects of (2), (4), (5), (6), and (7) of the first embodiment.

(1) In the present embodiment, the sealing member 60 and the reinforcing material 50A are laser welded, and thus heating of a welding spot such as brazing is not required and irradiation can be performed from the outside of the chamber 210 through the quartz glass 214. Accordingly, a heating unit or the like does not have to be arranged in the chamber 210, the chamber 210 can be reduced in size, and the manufacturing cost of the vacuum insulation panel 11 can be reduced. As a result, it is possible to manufacture a low-cost, high-performance vacuum insulation panel without performance degradation.

(2) The opening 51A and the evacuation port 32 may be misaligned in a case where, for example, the reinforcing material 50A is inside the second metal plate 30 and the reinforcing material 50A and the second metal plate 30 are not welded. Depending on the degree of misalignment, the evacuation port 32 is blocked, and then the vacuum evacuation in the evacuating step may become time-consuming. Accordingly, the position of the reinforcing material 50A needs to be confirmed immediately before the evacuating step. In addition, once the misalignment actually occurs, the manufacturing steps should be paused and the position of the reinforcing material 50A inside the second metal plate 30 should be manually corrected, which takes time and labor.

In the present embodiment, however, the circumferences of the reinforcing material 50A and the second metal plate 30 are welded such that the opening 51A of the reinforcing material 50A coincides with the central portion of the evacuation port 32 of the second metal plate 30. Accordingly, the reinforcing material 50A is not misaligned during the course of the stacking step.

Therefore, the vacuum evacuation in the evacuating step does not become time-consuming. The position of the reinforcing material 50A does not have to be confirmed immediately before the evacuating step. In addition, since there is no possibility of misalignment, the manual operation for correcting the position of the reinforcing material 50A inside the second metal plate 30 with the manufacturing steps paused does not occur.

Incidentally, in the present embodiment, the reinforcing material 50A is outside the second metal plate 30 even in a case where the reinforcing material 50A and the second metal plate 30 are not welded. Accordingly, even if the reinforcing material 50A is misaligned, the position of the reinforcing material 50A is confirmed with ease and the position is corrected in a simple manner.

(3) According to the method for manufacturing the vacuum insulation panel 1 of the present embodiment, the second metal plate 30 and the reinforcing material 50A are joined in advance in the stacking step in the present embodiment. Accordingly, in the laser welding step, the evacuation port may be blocked by two-sheet welding of the sealing member 60 and the reinforcing material 50A.

The reinforcing material 50A is thicker than the second metal plate 30. Accordingly, gapless close contact can be performed and laser welding-based sealing is facilitated when the opponent member to lower and press the sealing member 60 is the reinforcing material 50A larger in plate thickness than the second metal plate 30.

In addition, the second metal plate 30 is unlikely to be penetrated by laser.

EXPLANATION OF REFERENCE NUMERALS 1,11 VACUUM INSULATION PANEL
2 VACUUM INSULATION PANEL MANUFACTURING DEVICE
3 VACUUM DEVICE
10 CORE MEMBER
20 FIRST METAL PLATE
20 METAL PLATE
21 BULGING PORTION
30 SECOND METAL PLATE
30 METAL PLATE
31 BULGING PORTION
32 EVACUATION PORT
50 BACKING MEMBER
50A REINFORCING MATERIAL
51,51A OPENING PORTION
60 SEALING MEMBER
100 SEAM WELDING DEVICE
200 VACUUM SUCTION UNIT
210 CHAMBER
211 OPENING PORTION
214 QUARTZ GLASS
217 PACKING
250 SEALING MEMBER LIFTING MECHANISM
251 HOLDING PLATE
255 LIFTING PLATE
300 LASER WELDING UNIT

The invention claimed is:

1. A vacuum insulation panel comprising:
an insulating core member;
a first metal plate arranged on one side of the core member;
a backing member having an opening and arranged on the other surface of the core member;
a second metal plate arranged across the backing member on the other surface of the core member and having an evacuation port at a position stacking with the opening; and
a sealing member sealing the opening,
wherein outer sides of regions of the first metal plate and the second metal plate between which the core member is sandwiched are welded,
wherein the sealing member, the second metal plate, and the backing member are welded, and
wherein a vacuum state is created between the first metal plate and the second metal plate.

2. The vacuum insulation panel according to claim 1, wherein the sealing member is a magnetic body.

3. The vacuum insulation panel according to claim 1, wherein the backing member has an annular shape.

4. The vacuum insulation panel according to claim 1, wherein the backing member has the same diameter as the sealing member.

\* \* \* \* \*